(12) United States Patent
Aston

(10) Patent No.: US 6,349,985 B1
(45) Date of Patent: Feb. 26, 2002

(54) HOIST RING ASSEMBLY

(76) Inventor: John Alexander Aston, 28 Manordougherty Road, Markethill, County Armagh, BT60 1TY, Northern Ireland (GB)

(*) Notice: Subject to any disclaimer, the term of this patent is extended or adjusted under 35 U.S.C. 154(b) by 0 days.

(21) Appl. No.: 09/555,129

(22) PCT Filed: Nov. 25, 1998

(86) PCT No.: PCT/GB98/03519
§ 371 Date: Jul. 25, 2000
§ 102(e) Date: Jul. 25, 2000

(87) PCT Pub. No.: WO99/26875
PCT Pub. Date: Jun. 3, 1999

(30) Foreign Application Priority Data
Nov. 25, 1997 (GB) .............................. 9725088

(51) Int. Cl.[7] .................................................. B66C 1/66
(52) U.S. Cl. ...................... 294/1.1; 403/78; 403/164
(58) Field of Search ................................ 294/1.1, 67.1, 294/82.1, 82.15, 82.16, 86.4, 89, 93, 94; 403/78, 79, 164; 411/400, 427

(56) References Cited

U.S. PATENT DOCUMENTS

| | | | | |
|---|---|---|---|---|
| 3,297,293 A | * | 1/1967 | Andrews et al. | 294/1.1 X |
| 3,933,390 A | * | 1/1976 | Barrett et al. | 294/94 |
| 4,641,986 A | * | 2/1987 | Tsui et al. | 294/1.1 X |
| 4,705,422 A | * | 11/1987 | Tsui et al. | 294/1.1 X |
| 4,863,205 A | * | 9/1989 | Schron et al. | 294/89 X |
| 5,352,056 A | * | 10/1994 | Chandler | 294/82.1 X |
| 5,586,801 A | * | 12/1996 | Sawyer et al. | 294/1.1 |
| 5,775,664 A | * | 7/1998 | Martin | 294/1.1 X |
| 5,823,588 A | * | 10/1998 | Morghen | 294/1.1 |

FOREIGN PATENT DOCUMENTS

| | | | |
|---|---|---|---|
| DE | 29601685 | * | 5/1996 |
| GB | 2301081 | * | 11/1996 |

* cited by examiner

*Primary Examiner*—Johnny D. Cherry
(74) *Attorney, Agent, or Firm*—Ronald E. Greigg

(57) ABSTRACT

A hoist ring assembly is secured to a load plate. The assembly comprises an elongate central stud having a threaded shank portion at the top and is attached to a load plate at the bottom end. A rotatable ring is located above the load plate and secured about the stud by an upper nut on the upper threaded portion of the stud. A bail is pivotally secured to the ring. The load plate is securable against the ring. An intermediate integral transverse collar is provided on the stud and the load plate is attached to the other end of the stud by use of a lower nut engaging a threaded portion on the lower end of the stud.

20 Claims, 2 Drawing Sheets

HOIST RING ASSEMBLY

BACKGROUND OF THE INVENTION

1. Field of the Invention

This invention relates to a hoist ring assembly.

2. Description of the Prior Art

Hoist rings are widely used for the attachment and usually the lifting of loads and heavy objects by cranes etc. Often it is desired to have pivotal and rotatable maneuverability of the hoist ring to allow the position of the hoist ring or load to be manipulated during the lifting, transportation or lowering of the load.

Several hoist rings claim to provide pivotal and rotatable movement, e.g. GB Patent No. 2306154A and U.S. Pat. No. 5352056. However these rings involve the screwing of a stud into the load as the only form of attachment between the ring and the load. Upon lifting, any rotating load could rotate about the thread of the stud rather than with the stud, i.e. slip and become loose from the ring. Such a situation is obviously not safe and not desirable. Moreover, changing the stud for different loads or different situations is not a quick and simple task.

SUMMARY OF THE INVENTION

It is an object of the present invention to provide a hoist ring which can be securely attached to a load, be continuously rotatable, and which is rapidly changeable.

According to one aspect of the present invention, there is provided a hoist ring assembly securable to a load plate comprising an elongate central stud having a threaded shank portion at least at the top end means to carry a load plate at the bottom end, a rotatable ring located above the load plate and secured about the stud by an upper nut on the upper threaded portion of the stud, and a bail pivotally secured to the ring, the load plate being securable against the ring.

Preferably, an intermediate integral transverse collar is provided and the means for carrying the load plate is the other end of the stud having a threaded position engagable by a lower nut.

The integral collar of the present invention provides a fixed and extended meeting surface against which a load plate can be fully tightened, and which will not therefore slip and separate during lifting and turning of the load plate. The lower end of the stud also has a threaded portion. The shank of the stud directly below the collar could have a non-circular cross-section, e.g. square or another profiled shape, which fits into a correspondingly shaped slot or aperture in the load to prevent any rotation, and thus separation, between the stud and load plate on turning.

The load plate could be fastenable to the stud either by having a threaded slot into which the lower threaded portion of the stud can be fitted and secured by a nut, or by an aperture in the load plate beneath which a nut could be located onto the lower threaded portion. One major type of prior art device used for lifting apertured loads is a threaded eyebolt with, a nut securing the load to the shank of the eyebolt. However, rotation of the load acts directly on the nut, lending to significant wear and thus expected failure. This is avoided by the present invention as the load plate, the collar and therefore the stud are together held fast.

The collar could have a shaped circumference to help tighten it and the stud to the load plate, e.g. square or hexagonal for a spanner. The collar could be smaller, of similar width, or wider than the ring above it.

The ring is preferably shorter in height than the distance between the collar and the upper nut when fastened, to allow the ring to rotate as freely as possible. Either the shank of the stud between the collar and the upper threaded portion could be wider than the threaded portion, providing a shoulder onto which the upper nut could be tightened, or an elongate bushing could be added around the stud shank above the collar, which bushing is longer than the height of the ring.

A shouldered shank or a bushing allows the upper nut to be tightened onto the assembly with maximum torque. The upper nut could also or otherwise be secured in place to prevent any rotation relative to the stud with other means such as with a split pin through aligned slots in the top nut and shank of the stud. The top nut could also be a self-locking nut.

The ring may be of any suitable shape, size or design. Generally, the ring is cylindrical with a smooth bore for free rotation about the stud.

The hoist ring assembly preferably includes a washer between the top nut and the ring, and a washer between the load and any bottom nut. More preferably, the assembly includes, either as the top washer or in addition thereto, a reduced friction washer, e.g. a plain or roller bearing or thrust race, between the top nut or any top washer and the ring. A reduced friction washer could conveniently fit in the gap between the ring and the upper nut or washer if a shouldered shank or bushing as described above is used.

The bail may be pivotally secured to the ring in a number of ways. Preferably two co-axial shoulder pins pass through aligned apertures in the ends of a "U" shaped bail and the main ring. To help secure the shoulder pins in place, roll pins could extend through aligned apertures in the ring and shoulder pins transverse to the axis of the shoulder pins.

The hoist ring assembly of the present invention could be used to lift any suitable form or shape of load, whether industrial, agricultural, or domestic. One suitable load is the swivel plate of the lifting device as described in co-pending UK Patent Application No. 9619845. In combination, many forms and shapes, including odd shapes, can easily be lifted, transported and rotated by any suitable means, e.g. a material handler.

The stud could have means at one or both ends other than a threaded shank to allow it to be fastened to or secured to an overlying fastening means other than a nut, e.g. an apertured collar and fastening pin. Such other means can also fasten and/or secure the stud to the other parts of the assembly and/or the load. The invention is not therefore limited to the use of threads and nuts, although such would generally be used.

According to a second aspect of the present invention, there is provided a hoist ring assembly securable to a load plate comprising an elongate central stud having a threaded shank portion at each end and an intermediate integral transverse collar, a swivel shackle located above the collar and secured about the stud by an upper nut on the upper threaded portion of the stud, the load being securable against the lower face of the collar and fastenable to the stud using the lower threaded portion.

BRIEF DESCRIPTION OF THE DRAWINGS

Embodiments of the present invention will be described herein below, by way of example, with reference to the accompanying drawings, in which.

DESCRIPTION OF THE PREFERRED EMBODIMENTS

Figure 1:
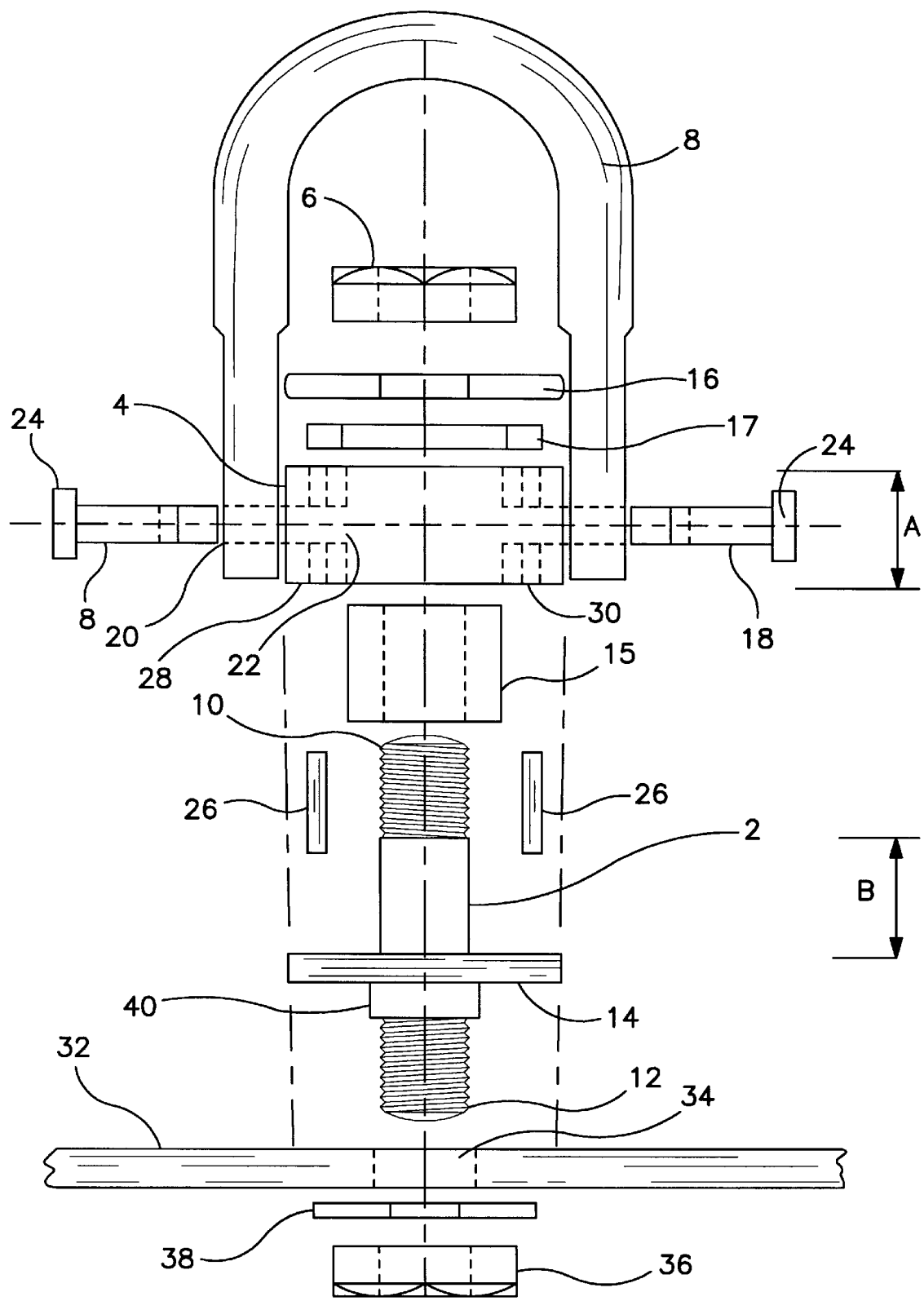
FIG. 1 is an exploded front elevational view of a hoist ring assembly according to the first embodiment of the present invention and a load plate.
Figure 2:
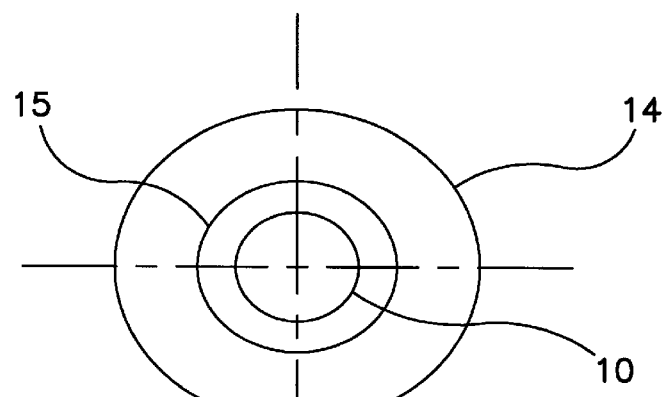
FIG. 2 is a plan view of the stud and bushing in FIG. 1.

Referring to FIGS. 1 and 2 of the drawings, a hoist ring assembly of a first embodiment has an elongate central stud 2, a ring 4, an upper nut 6 and a bail 8. The stud 2 has upper and lower threaded shank portions 10,12 respectively, and an intermediate collar 14. The collar 14 is integral with the stud 2. The collar 14 and stud 2 could be formed integrally, e.g. by forging or cold forming or machining, or be formed separately and subsequently joined e.g. by welding. A plan view of the stud 2 is shown in FIG. 2. The parts of the assembly will generally be formed from steel.

Around the stud 2 and between the collar 14 and the upper threaded portion 10 is a loose fitting bushing 15. The bushing is longer than the height of the ring 4, i.e. "B" is longer than "A" in FIG. 1. The bushing 15 provides an upper surface onto which the upper nut 6 can be tightened with maximum torque.

Immediately below the upper nut 6 is an upper washer 16, e.g. a steel washer, with a reduced friction washer 17 further below. The reduced friction washer 17, made of e.g. Teflon, reduces the rotational friction between the washer 16 and the ring 4. As with most if not all stud-based hoist rings, the load is transmitted to the bail 8 from the top of the stud 2 through nut 6 and washers 16 and 17 to the ring 4.

The increased length of the bushing 15 over the ring 4 allows room for the reduced friction washer 17, while upper nut 6 and upper washer 16 are fully tightened against the bushing 15 to the collar 14. The ring 4 is freely rotatable about the bushing 15 and therefore the stud 2.

The bail 8 has a general "U" shape. It could be of any suitable shape, and be continuous or have discrete ends. The bail 8 is securable to the ring 4 using two co-axial shoulder pins 18 which pass through aligned bores 20,22 in the ends of the bail 8 and ring 4 respectively. The shoulder pins 18 form the axis for pivotal movement of the bail 8. The shoulder pins 18 have flanged heads 24 to prevent further insertion, and are held in place by two roll pins 26 located in transverse aligned bores 28,30 in the shoulder pins 18 and ring 4 respectively. The roll pins 26 have "interference fit" in their bores 28,30, and their ends are covered by the reduced friction washer 16 and collar 14 at each end.

A load plate 32 has an aperture 34 therein through which the lower shank of the stud 2 can pass. A lower nut 36 and lower washer 38 then secure the load plate 32 tight against the lower face of the collar 14 using the lower threaded portion 12 of the stud 2. The unthreaded part 40 of the lower shank of the stud 2 could be square or otherwise non-circular in cross-section, to fit a correspondingly shaped aperture in a load plate 32 to prevent any possible rotation between the load plate and stud 2. The lower threaded shank portion 12 and lower unit 36 form the means to carry the load plate 32.

The ring 4 provides 360° possible rotational movement between the bail 8 and the load plate 32. The shoulder pins 18 allow maximum pivotal movement of the bail 8 about the load plate 32. A load is attached through the load plate 32 to the -hoist ring assembly.

The hoist ring assembly of the present invention provides at least two main advantages over prior art hoist rings. Firstly, the possibility of tight securement of the load plate to the stud using the extended face of the collar prevents movement taking place between the stud and the load plate during lifting. Secondly, the ability to rapidly and easily change or remove the stud from the load plate or the assembly by removal of either or both of the upper and lower nuts. Different studs could have different lower threaded portions (e-g. imperial or metric) for different threaded slots, or different sized lower shank portions for different sized loads or load plates, or different shaped or sized collars for different situations. Complete disassembly of the hoist ring assembly is not necessary to effect rapid stud replacement.

Removal of the upper nut does nevertheless also allow for rapid disassembly of the present hoist ring assembly due to the interrelationship of the roll pins and shoulder pins. The assembly is only held together by the upper nut. After removal of the upper nut, movement of the collar away from the ring exposes the roll pins for removal, allowing the shoulder pins to be rapidly withdrawn also. All parts of the assembly are then separate. Difficult or lengthy removal of locking rings or screws from prior art hoist rings is not required. Replacement of any parts of the assembly is therefore a very quick and simple task.

Figure 3:
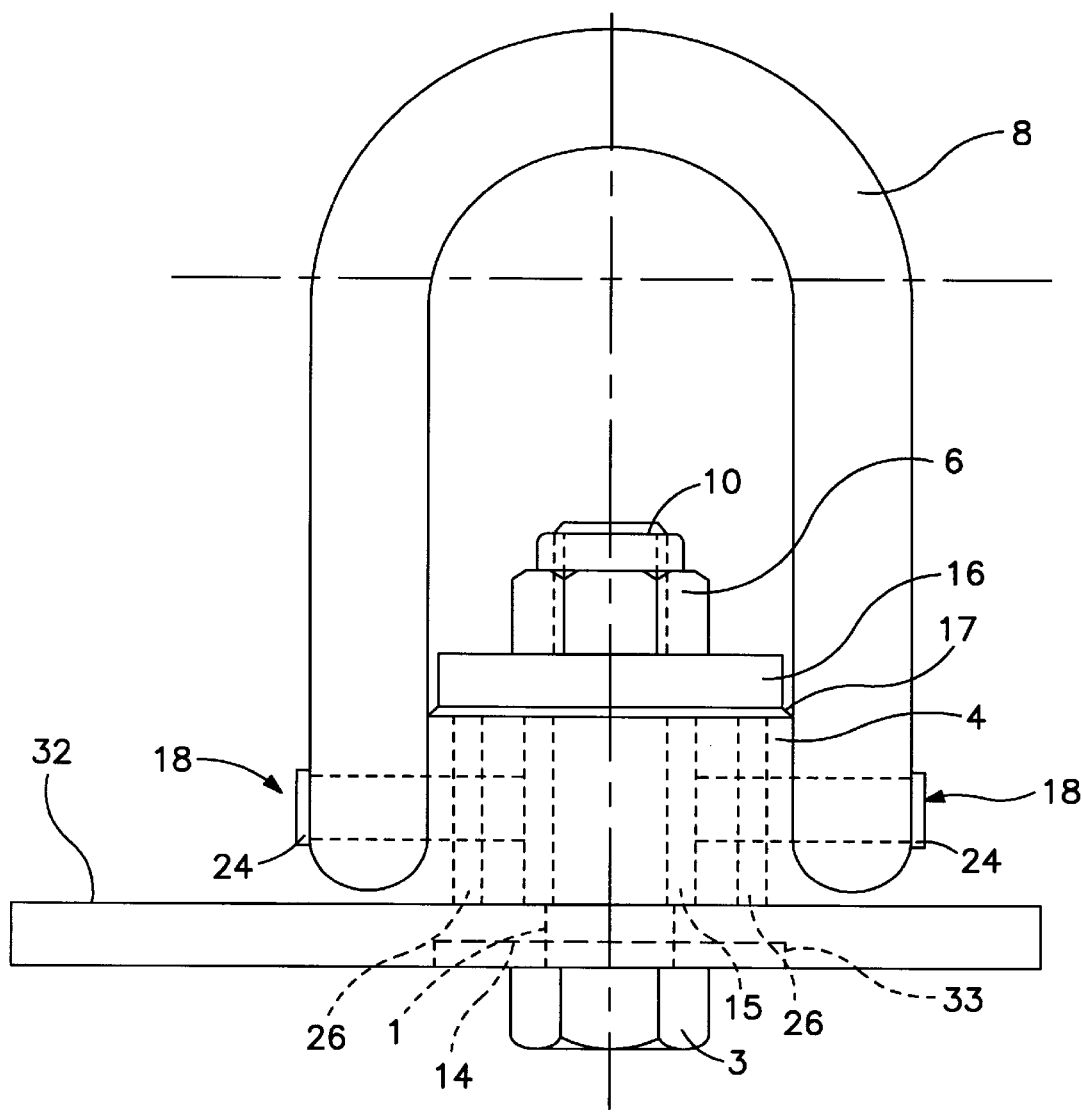
FIG. 3 is a front elevational view of a hoist ring assembly according to a second embodiment.

A second embodiment of the hoist ring assembly is shown in FIG. 3 in which like parts are denoted by like numerals. The central stud in this embodiment is a bolt having an integral head 3 equivalent to the lower nut. The part of the lower shank of the stud is of square or otherwise non-circular cross-section and fits a correspondingly shaped aperture in the load plate 32. No collar 14 is provided. The means to carry the load plate 32 comprises the integral head 3. Otherwise, the assembly is as described for the first embodiment and its use is similar.

Variations and modifications can be made without departing from the scope of the invention described above and as claimed hereinafter.

What is claimed is:

1. A hoist assembly securable to a load plate comprising an elongate central stud having an upper threaded portion near its top, and means to carry a load plate near its bottom, a rotatable ring located above the load plate and secured about the central stud by an upper nut on the upper threaded portion of the stud, a bail pivotally secured to the rotatable ring, an intermediate integral transverse collar being provided on the stud, with the load plate being securable against the intermediate integral transverse collar, said means to carry the load plate being the bottom of the central stud having a lower threaded portion engageable by a lower nut.

2. A hoist assembly according to claim 1, wherein the integral collar provides a fixed and extended meeting surface against which the load plate is fully tightenable, and which will not therefore slip and separate during lifting and turning of the load plate and any load attached thereto.

3. A hoist assembly according to claim 2, wherein the load plate is fastenable to the central stud is by an aperture in the load plate beneath which a nut is threaded and tightened onto the lower threaded portion.

4. A hoist assembly according to claim 1, wherein the central stud, directly below the collar, has a non-circular cross-section which fits into a corresponding shaped slot or aperture in the load plate to prevent any rotation, and thus separation, between the central stud and load plate on turning.

5. A hoist assembly according to claim 4, wherein the load plate is fastenable to the central stud by an aperture in the load plate beneath which a nut is threaded and tightened onto the lower threaded portion.

6. A hoist assembly according to claim 1, wherein the collar has a non-circular circumference to help tighten it and the central stud to the load plate by use of a spanner.

7. A hoist assembly according to claim 1, wherein the rotatable ring is shorter in height than the distance between the collar and the upper nut when fastened, to allow the rotatable ring to rotate as freely as possible.

8. A hoist assembly according to claim 2, wherein the upper nut is a self-locking nut.

9. A hoist assembly according to claim 1, wherein the central stud, between the collar and the upper threaded portion, is wider than the threaded portion, providing a shoulder onto which the upper nut is tightened.

10. A hoist assembly according to claim 1, wherein an elongate bushing is provided around the central stud above the collar, which bushing is longer than the height of the rotatable ring and provides a shoulder against which the upper nut is tightenable.

11. A hoist assembly according to claim 1, wherein a top washer is provided between the upper nut and the rotatable ring, and a lower washer is provided between the load plate and the lower nut.

12. A hoist assembly according to claim 11, wherein a reduced friction washer is provided between the top washer and the rotatable ring.

13. A hoist assembly according to claim 11, wherein a reduced friction washer is provided between the top washer and the upper nut.

14. A hoist assembly according to claim 1, wherein said bail is substantially "U" shaped, and wherein two co-axial shoulder pins pass through aligned apertures in the ends of said "U" shaped bail and the rotatable ring.

15. A hoist assembly according to claim 14, wherein the shoulder pins are secured in place by roll pins extending through aligned apertures in the rotatable ring and shoulder pins transverse to the axis of the shoulder pins.

16. A hoist assembly according to claim 1, wherein the central stud is a bolt whose head serves as the lower nut.

17. A hoist assembly securable to a load plate comprising an elongate central stud having an upper threaded portion at one end, a lower threaded portion at the other end, and an intermediate integral transverse collar, a swivel shackle located above the collar and secured about the central stud by an upper nut on the upper threaded portion of the stud, the load plate being securable against the lower face of the collar and fastenable to the central stud using the lower threaded portion.

18. A hoist assembly according to claim 17, wherein the load plate is fastenable to the central stud by an aperture in the load plate beneath which a nut is threaded onto the lower threaded portion.

19. A hoist assembly according to claim 17, wherein the integral collar provides a fixed and extended meeting surface against which the load plate is fully tightenable, and which will not therefore slip and separate during lifting and turning of the load plate and any load attached thereto.

20. A hoist assembly securable to a load plate comprising an elongate central stud having an upper threaded portion at least at the top of the central stud and means to carry a load plate at the bottom end of the central stud, a rotatable ring located above the load plate and secured about the central stud by an upper nut on the upper threaded portion of the stud, a bail pivotally secured to the rotatable ring with the load plate being securable against the rotatable ring, and means to carry the [a] load plate which consists of an integral head provided on the stud.

\* \* \* \* \*